July 20, 1965

L. B. BORST 3,196,081

NEUTRON REACTORS

Filed March 17, 1961

INVENTOR.
Lyle B. Borst

BY C. Kenneth Bjork

AGENT

July 20, 1965 L. B. BORST 3,196,081
NEUTRON REACTORS
Filed March 17, 1961 2 Sheets-Sheet 2

INVENTOR.
Lyle B. Borst
BY
C. Kenneth Bjork
AGENT

United States Patent Office 3,196,081
Patented July 20, 1965

3,196,081
NEUTRON REACTORS
Lyle B. Borst, Ossining, N.Y., assignor to The Dow Chemical Company, Midland, Mich., a corporation of Delaware
Filed Mar. 17, 1961, Ser. No. 96,519
3 Claims. (Cl. 176—11)

This invention relates to improvements in neutron reactors of the type disclosed in patent application Serial No. 654,837 filed April 24, 1957 by Lyle B. Borst.

In the neutron amplifier disclosed in that application, since termed "Convergatron," the density of a neutron flux is increased stage by stage starting from a relatively small source of neutrons. Each stage, excited by the preceding stage, generates neutrons which are, in turn, used to excite a subsequent stage. The environment in which this chain reaction takes place is, in the Convergatron, such that the chain reaction is brought to a steady-state condition, and is maintained, below criticality. For this purpose each stage is effectively decoupled for thermal neutrons from the succeeding stages. Each stage is defined by three regions: (1) the input or moderator region, (2) the intermediate or fuel region, and (3) the output or thermal neutron absorber region. The moderator region functions to slow down fast (epithermal) neutrons to slow (thermal) neutron energy level.

For the purpose of this disclosure the following definitions are adopted.

*Epithermal neutrons* are neutrons whose energy is so high that they do not interact with the material of the thermal neutron absorber region.

*Scattering* is the process whereby a neutron of any energy level in collision with any other material or particle changes its direction and loses part of its energy.

*Diffusion,* on the other hand, is used only in relation to thermal energy neutrons and defines the passing of the neutron through other material without change of energy.

*Feedback ratio* is the ratio of forward to backward transmission of neutrons between stages of a Convergatron.

The intermediate or fuel region of the Convergatron is made of fissile material responsive to thermal energy level neutrons to produce a greater number of neutrons under conditions which are below criticality. The output or thermal neutron absorber region is made of material which is substantially opaque to thermal neutrons and transparent to epithermal neutrons. This output region functions not only to decouple for thermal neutron flow each preceding stage from the succeeding stages but also to permit a polarized neutron flow of epithermal neutrons from the initial stage toward the subsequent stages.

It is a principal object of the present invention to improve the operation of the Convergatron by reducing the inherent feedback which occurs even in the presence of the moderator regions and the thermal neutron barriers of the absorber regions by further inhibiting the reverse flow of epithermal neutron transport.

It is another object of the present invention to provide a means of further increasing the margin of safety of a Convergatron while generating high neutron fluxes therein.

The manner in which this is effected, as well as the nature and mode of operation of the Convergatron and the relation of the present improvements to it, will be more fully understood by reference to the following description and the accompanying drawings.

Figure 1:
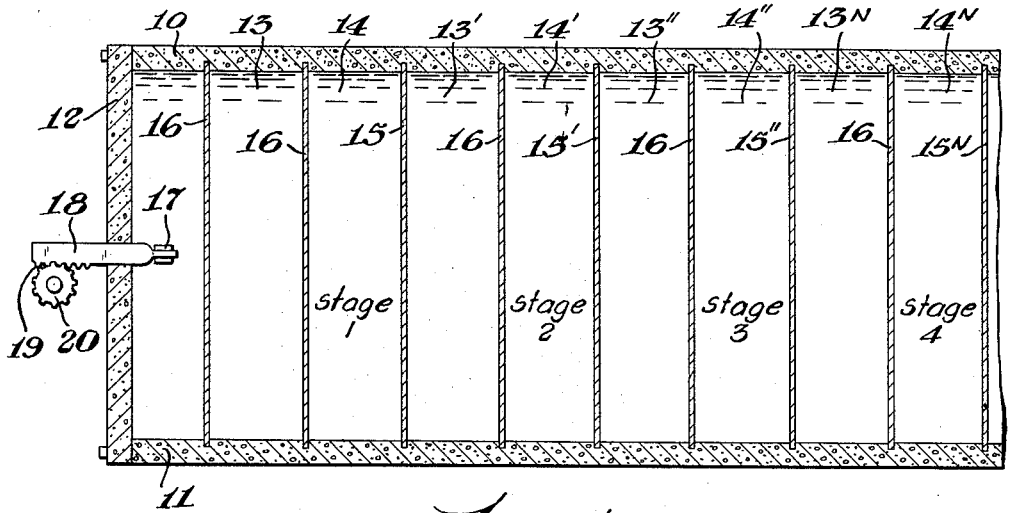
FIGURE 1 is a sectional view of one embodiment of a Convergatron of the character disclosed in the above-mentioned application Serial No. 654,837.

The structural form of the Convergatron illustrated by FIGURE 1 and discussed herein is a slab reactor in which the several stages of the reactor are arranged in cascade and are contained within a generally rectangular parallelepiped concrete enclosure.

In the FIGURE 1 there is shown a sectional view of the first four stages of such a neutron amplifier. The walls 10, 11 and 12 are made of shielding and absorber material such as concrete containing hydrogen or water, or the shield material described in U.S. Patent 2,726,339. The three main regions of each stage are the moderator region 13, the fuel region 14 and the thermal neutron absorber region or barrier 15. Corresponding regions of subsequent amplifier stages are represented by $13'$, $14'$, $15'$, $13''$, $14''$, $15''$ . . . $13^N$, $14^N$, $15^N$ respectively. Walls 16 of aluminum, stainless steel or other materials which are substantially transparent to neutron flow are placed between the regions to establish discrete boundaries and to prevent mixing and contamination of material in one region by the material of an adjacent region.

A controllable stimulating neutron source 17, carried by a rod 18, is mounted in the end wall 12 and is adjustable by the rack 19 and pinion 20.

The fast neutrons from the source 17 enter the moderator region 13, where they are moderated or slowed down to thermal energy levels. They will diffuse. Those which diffuse in the forward direction, that is, to the right in FIGURE 1, into the fuel region 14 will be absorbed by the fuel material, generating fast neutrons by fission. Some of these fast neutrons will cause fast fission within the fuel region 14 and others will be moderated by elastic collision with the moderator in region 13 until they are at thermal energies. These moderated, or slow neutrons, will again diffuse and be captured by the fuel in region 14 producing yet more fast neutrons.

Fast neutrons produced by fission in the fuel region 14 will be projected in all directions. Those moving forward, that is, to the right of FIGURE 1, will penetrate through the thermal neutron barrier 15 and will then be moderated to thermal energy level neutrons by the moderator material in region $13'$ of stage 2. Those neutrons, so thermalized, cannot migrate backwards, that is, to the left of drawing, FIGURE 1, because they will be absorbed by the thermal neutron barrier 15. Most epithermal or fast neutrons which migrate into the moderator region $13'$ will be moderated into thermal neutrons. Only those not so moderated enter into effective feedback.

The thermal neutrons diffusing or migrating into the fuel region $14'$ of stage 2 will produce fission therein and fast fission neutrons produced therefrom may move back into the moderator region 13′. These fast fission neutrons will be moderated in region 13′ by elastic collision so that there is little chance of a fast neutron from fuel region 14′ of stage 2 penetrating the thermal neutron barrier region 15 of stage 1 to activate the fuel in region 14 of stage 1. (However, although this chance is small it is, nevertheless, of critical importance as will be pointed out hereinafter.) Any fast or thermal neutrons which may escape through the walls 10 and 11 of region 14′ will be prevented from reaching the fuel region 14 of stage 1 or the subsequent fuel region 14″ of stage 3 by being blocked or absorbed by an extended wall region of the moderator region 13′, as explained in the earlier application.

Thus in the Convergatron illustrated by FIGURE 1, the migration of thermal neutrons is confined to the stage in which they are produced. The backward flow, i.e. feedback, of fast neutrons into a preceding stage is greatly reduced, although not wholly eliminated, by moderation to thermal energy levels in the moderator regions; while the fast neutrons which are capable of passing through the thermal neutron barriers pass freely to the right.

The above-described Convergatron has limitations in operation because of the inherent feedback of fast neutrons which may be undesirable. The following illustrative discussion on feedback as developed for a two-stage Convergatron points out more fully the desirability of controlling this phenomenon in a Convergatron.

For purposes of illustration, consider a Convergatron having two fuel zones coupled by an asymmetric moderator (e.g., cadmium and beryllium or cadmium-hydrogen-single crystal beryllium) and fed from an external neutron source (e.g., a Van de Graaff generator or Ra-Be source) in a steady state.

A given number ($N_0$) of source neutrons enter stage I per second and are amplified by the convergent chain reaction according to the relationship $$\frac{N_0}{1-\text{Keff}} = \frac{N_0}{\delta}$$

where Keff is the effective reproduction or multiplication factor, or constant, of the system, i.e. the ratio of the fast neutrons produced in one generation by fission to the original number of fast neutrons in an actual system of finite size, and, where $\delta$ is the negative reactivity of stage I of the system.

Of the neutrons, $N_0$, a fraction of these $a$ will escape as epicadmium neutrons through the cadmium layer.

These neutrons $a$ will be attenuated by scattering and absorption so that of those penetrating the cadmium a fraction $\alpha$ reach stage II and are usefully absorbed. The actual number of neutrons reaching stage II, therefore, expressed in terms related to the number of source neutrons, is $$\frac{N_0 a \alpha}{\delta}$$

In stage II, this number will be multiplied by the convergent chain reaction to give $$\frac{N_0 a \alpha}{\delta \delta'}$$

neutrons in stage II. The negative reactivity of stage II of the system is shown by $\delta'$. The gain, G, is shown by $$G = \frac{a\alpha}{\delta \delta'}$$

Of these neutrons in stage II, a fraction $b$ will escape from this stage in such a direction as to affect stage I. This fraction $b$ in turn will be attenuated by moderation to below the cadmium cutoff so that only a fraction $\beta$ of these will reach stage I. The feedback to stage I will, therefore, be $$\frac{N_0 a \alpha b \beta}{\delta \delta'}$$

If this fraction exceeds $N_0$, the coupled system will diverge and the system will be supercritical. The criterion for subcriticality is, therefore, $$\frac{a \alpha b \beta}{\delta \delta'} < 1$$

The neutron output, N, of the system will be $$N = \frac{N_0 a \alpha}{\delta \delta'} + \frac{N_0 a \alpha}{\delta \delta'}\frac{(b\beta a \alpha)}{\delta \delta'} + \frac{N_0 a \alpha}{\delta \delta'}\left(\frac{a \alpha b \beta}{\delta \delta'}\right)^2 + \cdots$$

$$= \frac{N_0 a \alpha}{\delta \delta'} \sum_{i=0}^{\infty} \left(\frac{a \alpha b \beta}{\delta \delta'}\right)^i = \frac{N_0 a \alpha}{\delta \delta'} \left(\frac{1}{1-\frac{a \alpha b \beta}{\delta \delta'}}\right)$$

$$= \frac{N_0 a \alpha}{\delta \delta' - a \alpha b \beta}$$

The gain G′ with feedback is therefore, $$G' = \frac{N}{N_0} = \frac{a\alpha}{\delta \delta' - a \alpha b \beta}$$

The feedback considered is positive in nature and tends to reduce the stability of the system with increased values. In a simple system there seems to be no analog to negative feedback so that the safest simple system will be one having no feedback. The ratio of feedback to no feedback gain is, therefore, a useful criterion and would be $$\frac{G'}{G} = \frac{1}{1-\frac{a \alpha b \beta}{\delta \delta'}}$$

Constants $a$, $\alpha$, $b$, $\beta$, $\delta$ and $\delta'$ are all design parametrics subject to choice. Constants $a$ and $b$ will be related to the geometry and leakage of the fuel zones and need not be the same. Delta and $\delta'$ depend only on the loading uranium and can be established last by careful addition of fuel. Alpha and beta are coupled constants since arbitrary reduction in $\beta$, desirable in suppressing feedback, will reduce $\alpha$ and, therefore, the coupling between stages. Then in order to achieve the designed gain, $\delta$ or $\delta'$ must be diminished, thereby reducing the safety margin of the system.

Although the discussion has been directed to a simple two stage Convergatron for purposes of illustration, this readily can be extended for multiple stage devices.

A desirable objective in designing a stage is to keep the effective multiplication factor Keff as far below unity as possible to avoid the possibility of a supercritical accident. Since the amplification per stage improves as 1/1-Keff, high amplification and a large departure from criticality (large negative reactivity) are contradictory objectives.

In the improved Convergatron of the present invention, a reduction in the inherent feedback of epithermal neutrons is effected by inserting, between a given stage and the next proceeding stage, a neutron barrier, said neutron barrier being a material having the characteristics of promoting the inelastic scattering of fast neutrons.

Figure 2:
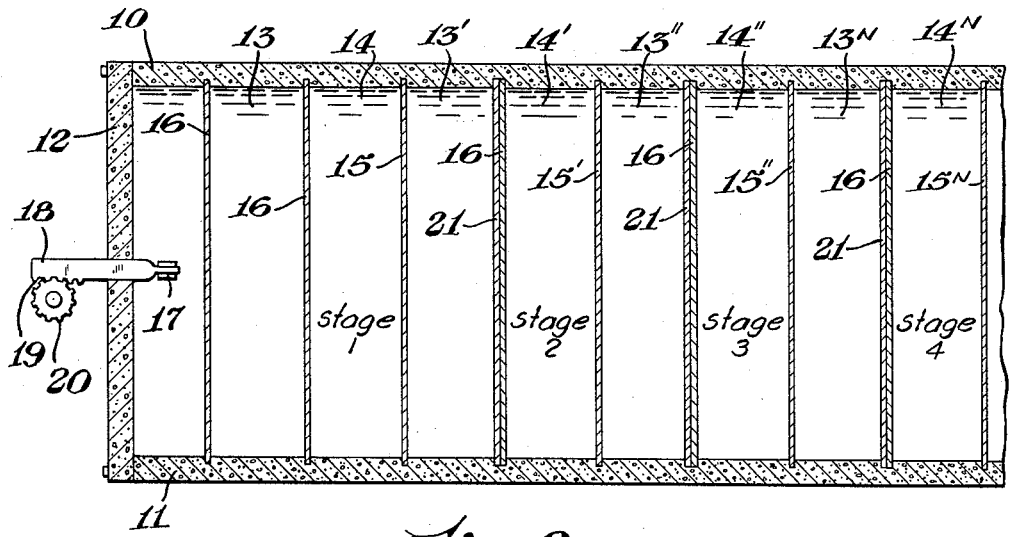
FIGURE 2 is a sectional view of the Convergatron of FIGURE 1 in which certain means embodying the improvement of the present invention is illustrated.

FIGURE 2 shows one embodiment of the instant invention wherein layers 21 of a material capable of inelastically scattering fast (high energy) neutrons have been placed in the moderator zones 13′ ... 13$^N$ of the Convergatron illustrated in FIGURE 1.

In the embodiment shown in FIGURE 2, the layers of neutron scattering material are flat, sheet-like members positioned in a given moderator region 13′, 13″ ... 13$^N$ adjacent the corresponding walls 16 between the fuel and moderator.

For other forms of the Convergatron, for example, one comprising a plurality of concentric shells as disclosed in the patent application Serial No. 654,837 the neutron scattering material will be positioned in the Convergatron's moderator region in the same relative position as shown for the instant embodiment, but the material will be shaped so as to conform with the shape of the fuel zone.

Advantageously the materials to be used in the instant invention will be selected from those metals and elements which preferentially scatter inelastically such fast neutrons resulting from fission but which also are transmissive to thermal neutrons, i.e., the metals possess a low capture cross-section and/or a low scattering cross-section for thermal neutrons.

For practical purposes, the material preferably will be of high atomic weight of above about 50 as heavy nuclei can more satisfactorily remove a large fraction of the incident neutron energy. However, any material which will inelastically scatter fast neutrons and which does not have a prohibitively high cross-section of capture for thermal neutrons can be used in the instant invention. To illustrate, after striking a heavy nucleus of atomic weight about 200, an incident neutron of 10 million electron volts (m.e.v.) will leave this nucleus with an energy of less than 1 m.e.v.

Table I which follow presents for a number of metals the inelastic neutron scattering cross-section values of these materials for various high energy neutrons as well as indicates the cross-sections these same elements exhibit towards thermal neutrons.

TABLE I

*Inelastic scattering cross section*

| Element | Neutron Energy Level | | | |
|---|---|---|---|---|
| | 5 m.e.v. | 1.4 m.e.v. | 0.7 m.e.v. | Thermal |
| | Effective Cross-Section (Barns) | | | |
| Fe | 1.20 | 0.69 | 0.28 | 2.5 |
| Sn | 2.01 | 1.12 | 0.37 | 0.62 |
| Pb | 2.21 | 0.71 | 0.21 | 0.17 |
| $Pb^{206}(n)$ | | | | 0.025 |
| $Pb^{208}(Th)$ | | | | 0.03 |
| $U^{238}$ | | 2.5 | 1.0 | 2.71 |
| $Th^{232}$ | | | | 7.56 |
| Bi | 2.19 | 0.4 | | 0.019 |

Lead and bismuth because of their high inelastic cross-section for fast neutrons and low absorption cross-section for thermal neutrons are preferred materials to use in the instant invention.

Thorium and uranium have particularly attractive inelastic scattering properties and therefore may be useful in small amounts even though these elements have appreciable thermal neutron capture cross-sections.

Additionally, iron, titanium, tin and zirconium can be used as scattering media although possessing somewhat lower inelastic scattering cross-sections than lead and bismuth.

The use of single crystals of the elements or the use of low temperatures of operation as an aid in avoiding Bragg scattering may be advantageous. Also, selection of favorable isotopes can lead to improved inelastic scattering performance. For example, radio lead ($Pb^{206}$), which has been shown to have a low capture cross-section for thermal neutrons may be a particularly appropriate and useful inelastic scatterer provided the inelastic scattering of high energy neutrons shown by radio lead is not significantly less than that of ordinary lead.

In practice, the material used as neutron scatterer ordinarily will possess a thickness that gives a scattering equivalent to about 1 inch of lead. Satisfactory scattering can be obtained utilizing metal thicknesses ranging from less than about 0.1 inch up to about 10 inches or more depending on the Convergatron system.

Introduction of the inelastic scatterer into a Convergatron will reduce somewhat the forward transparency of the system to epithermal neutrons. In effect this reduces the over all gain between stages to some extent, but this loss is not prohibitive to the operation.

Figure 3:
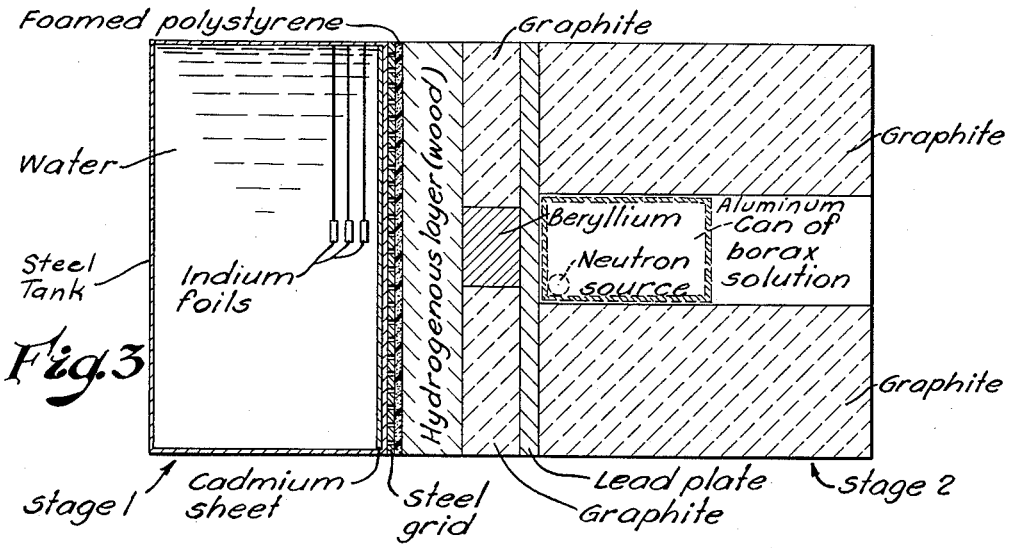
FIGURE 3 is a schematic representation of a Convergatron used to evaluate the effectiveness of lead plates as inelastic scatterers for fast neutrons.

Actual determinations of the effect of inelastic scattering material on the forward and reverse coupling of a two stage laboratory apparatus simulating the operation of a Convergatron have been carried out on the assembly shown schematically in FIGURE 3. In these tests, lead plates of varying thickness were tested for inelastic scattering efficiency.

It is to be understood this laboratory assembly is not an exact model of a Convergatron as shown in application Serial No. 654,837 or application Serial No. 711,099, now Patent No. 3,056,737. This assembly, however, clearly shows the operability of the presently disclosed and claimed novel improvement in such Convergatron reactors, i.e. the reduction in feedback of epithermal neutrons between a given amplifier stage and the next preceding stage of lower amplification.

In the laboratory apparatus, a given neutron source was positioned in a simulated stage, stage 2 as depicted in FIGURE 3. This neutron source serves to simulate the neutron flux present in a given stage in an actual Convergatron. In a simulated preceding stage, depicted as stage 1 in FIGURE 3, indium foils were suspended. The activation of these foils from neutrons from the source positioned in stage 2 was measured both with the novel improved neutron barrier of the present invention positioned between the stages and without these barriers. These studies, therefore, serve to illustrate the feedback effect present in a Convergatron and the utility of the present novel improvement in such reactors.

The first stage (moderator) of this particular simulated Convergatron consisted simply of a steel tank filled with water. The second stage was composed of a graphite reflector placed around an aluminum can, which held an aqueous solution of $Na_2B_4O_7 \cdot 10H_2O$ (0.01 gram/ cubic centimeter).

A neutron source was prepared specifically for use with this laboratory apparatus. This source was designed to yield neutrons of approximately a fission energy spectrum and consisted of a 25-millicurie radium-beryllium neutron source surrounded by paraffin impregnated with one pound of uranium oxide. This assembly in turn was placed in a glass flask which also was covered by paraffin. The resulting glass-encased unit was then placed in a cylindrical iron can of about 6 inches in diameter and about 5 inches in height.

In evaluating lead as an inelastic scatterer, plates of a given thickness were inserted into a two-inch gap maintained between the graphite-beryllium moderator zone and the second stage of the simulated Convergatron. These plates, in all tests, rested flatly against the graphite reflector of stage 2 and were positioned so as to be centered relative to the opening of this reflector into which the can of borax solution was fitted.

Additionally, in these studies, the gap between the hydrogeneous layer and the cadmium sheet contained both a steel gridwork designed to help support the cadmium as well as a thickness of foamed polystyrene insulating material. (This latter material was a residue from a previous experiment.)

In measuring feedback to the first stage, the can of borax solution was removed from the graphite reflector (stage 2) and the neutron source was placed in the opening of the reflector adjacent the 2 inch gap into which the lead plates were positioned.

Bare indium foils, fastened against aluminum tubes and hung in stage 1, were used to determine the amount of feedback. β-Ray countings taken from the indium foils and interpreted by standard calculation techniques (W. J. Price, "Nuclear Radiation Detection," p. 282, McGraw-Hill Book Co., 1958) were used to express the feedback as a saturation activity at a given distance from the cadmium. All of the indium foils were counted by means of the same thin-walled Geiger-Muller tube and scaler combination and a standard foil-tube geometry was maintained throughout the experiments. Further the sensitivity of the counting system to β-rays was periodically checked with a uranium oxide "standard" and found to be invariant.

The measured activations from feedback were generally very weak. Therefore, several foil measurements were made at each point and the readings combined to give tolerable experimental precision. Table II which follows compares the saturation activity at various distances from the cadmium for the apparatus both with and without lead plates between the first and second stages. The errors reported are all standard deviations calculated on the basis of Poisson statistics. Values shown for the saturation activity are on an arbitrary scale characteristic of the geometry and efficiency of the particular counting system employed.

TABLE II

*Measurement of feedback*

| Run No. | Thickness of Lead Plate,[2] inches | Saturation Activity [1] | | |
|---|---|---|---|---|
| | | Axial Distance from Cadmium Sheet into First Stage (cm.) | | |
| | | 5.1 | 9.6 | 14.6 |
| 1 | No plate [3] | 21.10±1.3 | 8.35±1.3 | 4.1±1.0 |
| 2 | No plate | 17.3±2.2 | 5.0±0.8 | 4.8±2.3 |
| 3 | 0.5 | 21.1±1.6 | 8.3±1.0 | 2.0±1.2 |
| 4 | 1.5 | 12.1±1.9 | 3.2±0.8 | 2.85±1.1 |

[1] Per gram of indium per minute, arbitrary scale.
[2] Plate size 16.2 x 20.1 inches.
[3] No. 2 inch gap between first and second stages.

One irregularity can be noted in the results presented in table II, i.e. the insertion of the 0.5 inch lead plate into the gap produced a significant increase in the experimentally measured feedback over that shown for no lead in the 2 inch gap. Comparing the feedback results for the 0.5 inch lead scatterer with those obtained when tests were run without the gap in the system showed that these values were practically coincidental. This fact suggests that the lack of any neutron scattering material inside this gap permitted a considerable amount of direct leakage from it. The partial shielding of the neutron source by the 0.5 inch thick lead plate, probably served appreciably to reduce such leakage through elastic scattering, this effect having a greater influence on feedback than the inelastic collisions of high energy neutrons.

Figure 4:
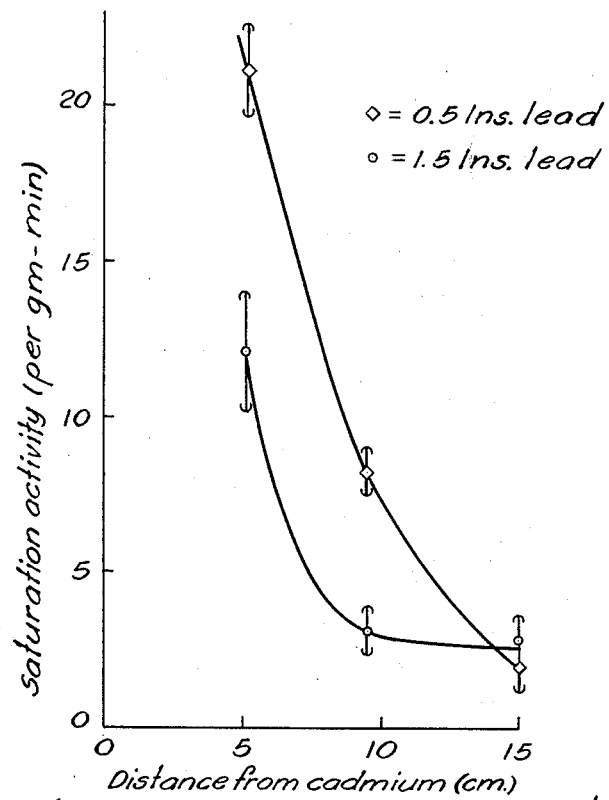
FIGURE 4 is a graph showing the effect of lead plate thickness on the feedback of the Convergatron of FIGURE 3.

In light of these results, it was deemed advisable to make a determination of feedback through 0.5 inch of lead relative to that through 1.5 inch of lead. In this regard the significant value is simply the ratio of areas under the curves shown in FIGURE 4 for the saturation values obtained with the 0.5 and 1.5 inch plates in the system.

The evaluation of this ratio, over a range of distances extending from the cadmium sheet to some distance where the saturation activity had fallen to a low value indicated that scattering shown by a material equivalent to a one inch thickness of lead reduced the feedback between stage two and stage one by a factor of 0.42±0.1 as measured by the activation of the bare indium foils. Expressed in terms of operational procedures, this reduction in feedback is equivalent to an increase of about 11 percent in the safety margin of this particular laboratory simulated two-stage Convergatron.

Additionally inelastic interactions between the source neutrons and the inelastic scatterer produces changes not only in the magnitude of reverse transmission as shown, but also in the energy spectrum of fed back neutrons. Consider the relaxation lengths associated with exponential functions fitted through the data points at axial distances of 5.1 and 9.6 cm. for both the insertions of 0.5 and 1.5 inch of lead. The latter instance yields a relaxation length in water of $3.3_5 \pm 0.7$ cm., whereas the former case shows one of $4.3 \pm 0.7_5$ cm. Feedback in the presence of an inelastic scatterer thus contains a lesser proportion of strongly penetrating, high energy neutrons than otherwise.

Various modifications can be made in the instant invention without departing from the spirit or scope thereof for it is to be understood that I limit myself only as defined in the appended claims.

I claim:
1. In a neutron amplifier having a controllable stimulating neutron source and, associated with said source in cascade, a plurality of amplifier stages each including an input region containing neutron moderator material in which neutrons of epithermal energy from the source are moderated to thermal energy levels and a fuel region containing neutron fissionable material in mass concentration and geometric configuration adapted to augment the neutron flow by a steady state subcritical reaction, and, between each stage and the next succeeding stage, a neutron barrier substantially opaque to thermal neutrons but transmissive to epithermal neutrons, whereby an amplified output of epithermal neutrons is subcritically produced, the improvement which comprises inserting into the moderator zone of a given stage a metal selected from the group consisting of lead and bismuth, said metal being of a thickness ranging from about 0.1 to about 10 inches, said metal being characterized in that it inelastically scatters epithermal neutrons thereby inhibiting the backward flow of said epithermal neutrons from said given stage to the next preceding stage of said subcritical neutron amplifier.

2. The improvement in subcritical neutron amplifier as defined in claim 1 wherein the neutron barrier is lead, said lead being of a thickness ranging from about 0.1 to about 10 inches.

3. The improvement in subcritical neutron amplifier as defined in claim 1 wherein the neutron barrier is bismuth, said bismuth being of a thickness ranging from about 0.1 to about 10 inches.

References Cited by the Examiner

UNITED STATES PATENTS

| 2,780,595 | 2/57 | Fermi | 204—193.2 |
| 2,921,007 | 1/60 | Spinrad | 204—193.2 |
| 2,982,709 | 5/61 | Miles | 204—193.2 |
| 2,993,850 | 7/61 | Soodak et al. | 204—193.2 |
| 2,992,982 | 7/61 | Avery | 204—193.2 |
| 3,056,737 | 10/62 | Borst et al. | 204—193.2 |

OTHER REFERENCES

KAPL-M-RWS-1, A Stable Fission Pile With High Speed Control, Samsel, Feb. 14, 1947, declassified Mar. 9, 1957, 7 pages.

REUBEN EPSTEIN, *Acting Primary Examiner.*

CARL D. QUARFORTH, *Examiner.*